United States Patent
Giordano et al.

(10) Patent No.: US 9,622,079 B2
(45) Date of Patent: Apr. 11, 2017

(54) SECURE DISTRIBUTION OF ELECTRONIC CONTENT

(71) Applicant: ACCENTURE GLOBAL SERVICES LIMITED, Dublin (IE)

(72) Inventors: Giuseppe Giordano, Juan les Pins (FR); Emmanuel Viale, Nice (FR); Jean-Baptiste Delinselle, Juan les Pins (FR)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/645,669

(22) Filed: Mar. 12, 2015

(65) Prior Publication Data
US 2015/0264573 A1 Sep. 17, 2015

(30) Foreign Application Priority Data
Mar. 12, 2014 (EP) ..................................... 14305356

(51) Int. Cl.
*G06F 21/00* (2013.01)
*H04W 12/08* (2009.01)
(Continued)

(52) U.S. Cl.
CPC ............. *H04W 12/08* (2013.01); *H04L 63/08* (2013.01); *H04L 63/107* (2013.01); *H04L 67/1097* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 6,370,629 B1 * | 4/2002 | Hastings | G06F 21/6218 711/153 |
| 8,112,471 B2 * | 2/2012 | Wei | H04L 67/1008 709/202 |

(Continued)

FOREIGN PATENT DOCUMENTS

| | | |
|---|---|---|
| EP | 2375799 | 10/2011 |
| WO | 2004/004278 | 1/2004 |
| WO | 2012/143706 | 10/2012 |

OTHER PUBLICATIONS

European Search Report issued on EP Application No. 14305356, filed Mar. 12, 2014, European Patent Office, Sep. 1, 2014.

*Primary Examiner* — Farid Homayounmehr
*Assistant Examiner* — Maung Lwin
(74) *Attorney, Agent, or Firm* — Mannava & Kang, P.C.

(57) ABSTRACT

A method of accessing electronic content received by a mobile device includes: determining a current location of the mobile device; comparing the current location with a zone within which an instance of electronic content may be accessed; when the result of the comparison indicates that the mobile device is located within the zone, accessing by the mobile device the instance of electronic content and providing at least part of the instance of electronic content for display on the mobile device; determining a new current location of the mobile device while the instance of electronic content is being accessed; and checking that the new current location of the mobile device is with the zone. If the mobile device is no longer within the zone, the mobile device terminates the access to the instance of electronic content.

17 Claims, 3 Drawing Sheets

(51) Int. Cl.
  *H04L 29/06* (2006.01)
  *H04L 29/08* (2006.01)
  *H04W 4/02* (2009.01)

(56) References Cited

U.S. PATENT DOCUMENTS

| | | | | |
|---|---|---|---|---|
| 8,467,770 | B1* | 6/2013 | Ben Ayed | H04L 63/107 455/41.1 |
| 8,542,833 | B2* | 9/2013 | Devol | G06F 21/305 380/259 |
| 8,768,379 | B2* | 7/2014 | Busch | H04W 4/02 370/338 |
| 8,832,374 | B1* | 9/2014 | Schaefers | H04L 67/1097 711/115 |
| 2004/0186890 | A1* | 9/2004 | Huang | H04L 12/5865 709/206 |
| 2005/0189415 | A1* | 9/2005 | Fano | G06Q 10/087 235/383 |
| 2006/0059096 | A1 | 3/2006 | Dublish et al. | |
| 2006/0200540 | A1 | 9/2006 | Morishima | |
| 2009/0077620 | A1* | 3/2009 | Ravi | H04L 63/102 726/1 |
| 2009/0183264 | A1 | 7/2009 | Chmaytelli et al. | |
| 2009/0195399 | A1* | 8/2009 | Harris | G06F 21/10 340/686.1 |
| 2010/0235508 | A1* | 9/2010 | Weigand | G11B 20/0084 709/225 |
| 2011/0055891 | A1* | 3/2011 | Rice | G06F 21/88 726/2 |
| 2011/0252464 | A1* | 10/2011 | Sanjeev | H04L 63/107 726/7 |
| 2013/0139269 | A1 | 5/2013 | Shaikh et al. | |
| 2013/0346492 | A1* | 12/2013 | Wang | G06F 17/30011 709/203 |
| 2014/0047531 | A1* | 2/2014 | Zaitsev | G06F 21/123 726/9 |
| 2014/0280740 | A1* | 9/2014 | Alley | H04L 29/08072 709/219 |
| 2015/0302188 | A1* | 10/2015 | Potbhare | H04L 9/3234 713/185 |

* cited by examiner

SECURE DISTRIBUTION OF ELECTRONIC CONTENT

FIELD

The present disclosure relates to the field of electronic content distribution, and in particular to a method and system for controlling the distribution of a sensitive content to one or more mobile devices.

PRIORITY

This patent application is a non-provisional which claims priority under 35 U.S.C. 119(a)-(d) to European Application Serial Number 14305356.9, filed Mar. 12, 2014, and entitled "Secure Distribution of Electronic Content", which is incorporated by reference in its entirety.

BACKGROUND

Modem mobile devices, such as smart phones and tablet computers, have ample processing resources and relatively large display screens to permit a wide range of documents types to be viewed. This has led to an increase in the use of such devices for viewing documents at events such conferences, business meetings or the like. Therefore, documents that are to be referred to during such an event, for example presentation slides, minutes of previous meetings, or other relevant material, can be provided electronically to the participants instead of, or in addition to, a paper copy.

Some events may be of a confidential nature, and thus the documents relating to the event may contain sensitive information, the distribution of which is to be restricted. However, there are difficulties in controlling the distribution of such sensitive content when it is provided electronically to event participants.

There is thus a need in the art for a method and system for controlling the distribution of sensitive content to mobile devices.

SUMMARY

It is an aim of embodiments of the present description to at least partially address one or more needs in the prior art.

According to one aspect, there is provided a method of accessing electronic content received by a mobile device, the method comprising: determining a current location of the mobile device; comparing the current location with a zone within which an instance of electronic content may be accessed; when the result of the comparison indicates that the mobile device is located within the zone, accessing by the mobile device the instance of electronic content and providing at least part of the instance of electronic content for display on the mobile device; determining a new current location of the mobile device while the instance of electronic content is being accessed; and checking that the new current location of the mobile device is with the zone, wherein if the mobile device is no longer within the zone, terminating by the mobile device the access to the instance of electronic content.

According to one embodiment, the method further comprises determining by the mobile device a further security scheme associated with a further instance of electronic content, wherein the further security scheme is different from the security scheme associated with the instance of electronic content.

According to one embodiment, the current location and new current location of the mobile device are determined based on the presence or level of one or more signals between the mobile device and one or more wireless transmitters.

According to one embodiment, the current location and new current location of the device are determined by the mobile device based on the presence or level of one or more signals received from one or more wireless transmitters.

According to one embodiment, the one or more wireless transmitters are communications beacons, and the current location and new location of the device are determined by the mobile device based on data extracted from one or more signals received from the communications beacons.

According to one embodiment, the method further comprises receiving by the mobile device from a remote server the instance of electronic content and accompanying data indicating the zone within which the instance of electronic content may be accessed, and storing the instance of electronic content and accompanying data in a volatile memory of the mobile device.

According to one embodiment, the method further comprises receiving a notification, on the mobile device, that the mobile device is located within the zone and that the instance of electronic content may be accessed.

According to one embodiment, the method further comprises determining, by the mobile device, whether a user profile activated by a user of the mobile device is authorized to view the instance of electronic content.

According to one embodiment, the method further comprises comparing, by the mobile device, a current time with a time-limit for viewing of the electronic content, and if the time-limit has been exceeded, terminating by the mobile device the access to the instance of electronic content.

According to one embodiment, the method further comprises: capturing, during the display of at least part of the instance of electronic content, an image using a display-side camera of the mobile device; performing face recognition on the image to identify the presence of any faces in the image; and verifying that at least one of the faces is a user of the mobile device authorized to view the instance of electronic content; and terminating by the mobile device the access to the instance of electronic content if any of the faces is not an authorized user or if no face is identified.

According to one embodiment, the method further comprises preventing, during the display of at least part of the instance of electronic content, a user of the mobile device from capturing a screenshot of any part of the instance of electronic content.

According to one embodiment, the method further comprises determining by the mobile device a security scheme associated with the instance of electronic content, wherein the security scheme includes a security condition indicating that location verification of the mobile device is required for access to the instance of electronic content.

According to one embodiment, the security scheme comprises one or more conditions selected from the following list: the instance of electronic content is accessible only on authorized hardware and/or only for authorized user profiles; the instance of electronic content is accessible only in one or more defined zones; the instance of electronic content is accessible only if a password is correctly entered; the instance of electronic content is accessible only if a user authentication scheme is successful involving the verification of at least one biometric sample; the instance of electronic content is rendered inaccessible if the authorized user is not viewing the content.

According to one embodiment, the method further comprises, prior to accessing the instance of electronic content by the mobile device, receiving by the mobile device identification data of the user of the mobile device, and comparing the identification data with reference data to verify the identity of the user.

According to one embodiment, if the mobile device is no longer within the zone, the instance of electronic content is deleted from the mobile device or locked or re-encrypted such that it is no longer accessible.

According to one embodiment, terminating by the mobile device the access to the electronic content does not prevent other electronic content from being accessed by the mobile device.

According to a further aspect, there is provided a mobile device comprising: a memory for temporarily storing at least one instance of electronic content; a display screen; and a processing device configured to: determine a current location of the mobile device; compare the current location with a zone within which the at least one instance of electronic content may be accessed; when the result of the comparison indicates that the mobile device is located within the zone, access the at least one instance of electronic content and provide at least part of the instance of electronic content for display on the display screen; determine a new current location of the mobile device while the instance of electronic content is being accessed; and check that the new current location of the mobile device is within the zone, wherein if the mobile device is no longer within the zone, terminating by the mobile device the access to the instance of electronic content.

According to one embodiment, the processing device is configured to determine a security scheme associated with the instance of electronic content, wherein the security scheme includes a security condition indicating that location verification of the mobile device is required for access to the instance of electronic content.

According to one embodiment, the processing device is configured to determine the current location and the new current location of the mobile device based on the presence or level of one or more signals received from one or more wireless transmitters.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
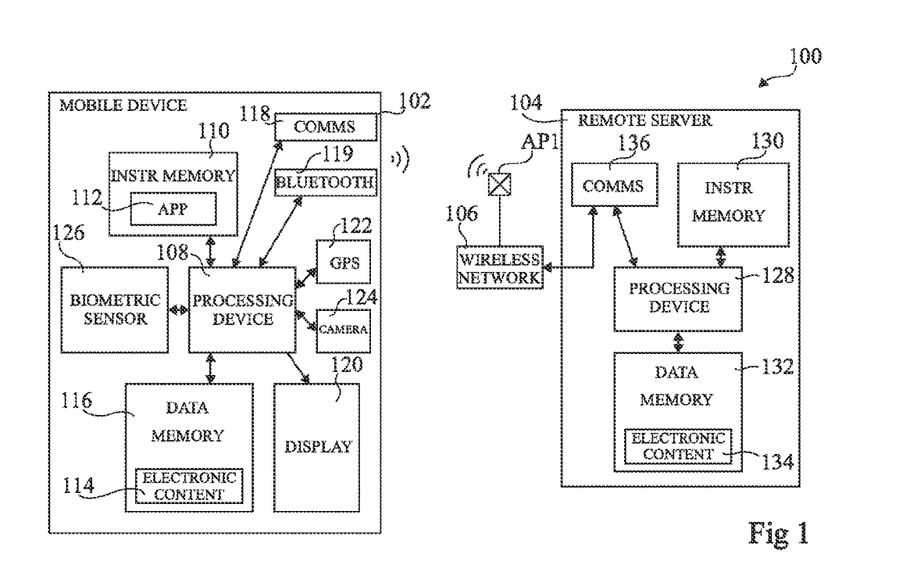
FIG. 1 illustrates a system for securely distributing electronic content according to an embodiment of the present disclosure.

FIG. 1 schematically illustrates a content distribution system 100 according to an example embodiment.

The system 100 comprises a mobile device 102 in wireless communication with a remote server 104, for example via an access point AP1 of a wireless network 106. The mobile device 102 is any portable device capable of mobile communications, such as a smart phone, tablet computer, laptop computer, or the like. For example, the wireless network 106 is a mobile telecommunications network, WLAN (wireless local area network), Bluetooth interface or other network providing wireless communications (the name "Bluetooth" may be a registered trademark). Typically however, connectivity with the remote server 104 is provided via a telecommunication network, such as 3G or 4G communications, or via WLAN.

The mobile device 102 includes a processing device 108 comprising one or more processors under the control of instructions stored in an instruction memory 110. For example, the memory 110 stores an operating system of the mobile device, which is for example iOS or Android (the names "iOS" and "Android" may be registered trademarks). Furthermore, the instruction memory 110 for example stores an application APP 112 for managing access to an instance of electronic content 114, which is for example stored in a data memory 116 also in communication with the processing device 108. In some embodiments, the instruction memory 110 storing the application 112 is at least partially implemented by one or more flash memories or other types of non-volatile data storage device. The data memory 116 storing the application 112 is for example at least partially implemented by a RAM (random access memory), such as a DRAM (dynamic random access memory) or other type of volatile memory device.

The mobile device 102 further comprises at least a first wireless communications interface 118 coupled to the processing device 108. Interface 118 for example allows one or more types of wireless communications, such as communications via a mobile telecommunications network, and/or Wi-Fi (wireless fidelity) communications. Furthermore, in some embodiments a further wireless interface 119 is also coupled to the processing device 108 permitting communications according to the Bluetooth standard.

The processing device 108 is also for example coupled to a display screen 120, to a positioning device 122, to a camera 124 and/or to one or more biometric sensors 126. The display screen 120 is for example a touch screen that provides a user input in addition to displaying content. Alternatively or additionally, the mobile device 102 may comprise a keyboard, keypad, mouse or other user input device (not illustrated in FIG. 1). The positioning device 122 is for example a GPS (global positioning system). The camera 124 is for example a CMOS image sensor or the like, mounted on the display-side of the mobile device 102 such that it captures images of a user of the device while the user is viewing the display 120. The biometric sensor 126, which could be internal to the mobile device 102 or an external sensor connected to the mobile device, is for example a fingerprint sensor, iris scanner, microphone or other sensor capable of capturing a biometric sample. Alternatively or additionally, this function could be performed by the camera 124, particularly in the case that the biometric sample is an image of the face of the user.

In some embodiments, the mobile device 102 comprises a trusted execution environment, for example comprising at least the part of memory 110 that stores the application 112 and also an allocation of the processing resources of the processing device 108. The trusted execution environment permits the execution of software applications, such as the application 112, in isolation from the execution of other software stored in the instruction memory 110, thereby providing additional security to the application 112 for restricting access to the content. The trusted executed environment also for example allows functions such as password entry and/or biometric capturing to be performed securely. Furthermore, the trusted execution environment for example can provide secure and/or encrypted storage for the electronic content 114.

The remote server 104 for example includes a processing device 128 comprising one or more processors under the control of instructions stored in an instruction memory 130. The processing device 128 is also coupled to a data memory 132, storing electronic content 134, and a communications interface 136 via which the electronic content 134 may be transmitted to the mobile device 102. The content is for example wirelessly transmitted to the mobile device 102 via a 3G interface or WLAN, but in some embodiments other wireless interfaces could be used, such as a Bluetooth interface. In some embodiments, at least some functions of the remote server 104, such as making the electronic content available to the mobile device 102, could additionally or alternatively be provided by a program running on a further mobile device similar to the device 102.

The electronic content stored by the data memory 132 of the remote server 104 and transmitted to the data memory 116 of the mobile device is for example an electronic document, image, video or other content in any format readable by the mobile device 102. The document could correspond to an ensemble of text and/or images in PDF, HTML or another format, to a spreadsheet or part of a database in an appropriate format, and/or to presentation slides, for example in Powerpoint format (the name "Powerpoint" may correspond to a registered trademark). At least some elements of the electronic content are sensitive, meaning that their distribution is to be restricted to a limited group of people. Furthermore, as will be described in more detail below, this content is secured content in that at least some protection mechanisms are implemented to secure the distribution of the content.

In an exemplary embodiment, a user of the mobile device 102 is for example to attend an event or a meeting, and takes the mobile device 102 for use as a content browser. Upon arrival at the event, the electronic content 134 can be made available to the mobile device 102, for example via the wireless network 106. For example, the application 112 can provide a 'push' notification to the mobile device notifying the user that secure documents are available for download. Access to this content is controlled by the application 112, and thus the processing device 108 is only able to access this content and display it on the display screen 120 if certain security conditions are met, as will be described in more detail below.

As indicated above, in some embodiments, electronic content may be made available by a further mobile device rather than the remote server. For instance, a conference leader may have documents on a tablet computer and wishes to share them with attendees at the conference directly from the tablet computer. Connection to a remote server 104 may still however be employed to verify at least some of the security conditions that must be met for accessing the document.

Figure 2:
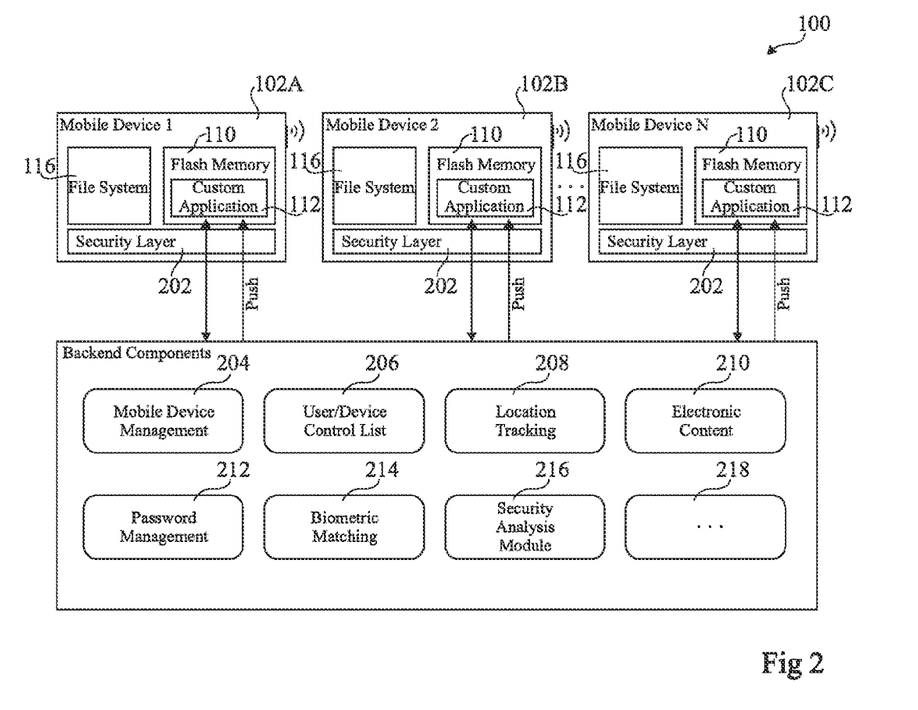
FIG. 2 illustrates the system of FIG. 1 in more detail according to an example embodiment of the present disclosure.

FIG. 2 schematically illustrates certain aspects of the system 100 in more detail. In the example of FIG. 2, there are three mobile device 102A, 102B and 102C each belonging to a different user who is to attend an event. Each mobile device 102A to 102C is in communication with backend components forming the remote server 104, and comprises a flash memory implementing the instruction memory 110 and storing the application 112, which is for example a custom application. Furthermore, each of the mobile devices 102A to 102C for example comprises a security layer 202, which permits secure reception and storage of the electronic content from the remote server 104 by performing encryption and decryption.

The backend components of the remote server 104 include for example one or more of the following functional components:

Mobile Device Management 204: the remote server 104 for example implements digital rights management (DRM) with respect to the electronic content, such that access to the content is limited to specific hardware, or to users who have activated an authorized user profile on the mobile device. For example, the application 112 executing on the mobile device may request that the user signs into an account, such as that associated with an email account or a customer account, using a user name and password associated with that account. This user profile is then checked against an authorized user profile stored by the remote server 104 in association with the content before access to the content is granted.

User/Device Control List 206: the remote server 104 for example remotely controls, in combination with the application 112 stored by the mobile device, the access to the electronic content using for example an access list stored by the remote server 104 that indicates identifiers of devices or users that are authorized to access the content. For example, the identifiers correspond to the IMSI (International Mobile Subscriber Identity) of authorized subscribers, or IMEI (International Mobile Station Equipment Identity) numbers of authorized mobile devices, or the (static) IP address of authorized mobile devices, or MAC (media access control) address of an authorized mobile device, or authorized user profiles (username and password).

Location Tracking 208: as will be described in more detail below, the remote server 104 for example specifies, for each item of electronic content, a restricted area (i.e. a predefined place or zone) in which the content may be accessed.

Electronic Content 210: the remote server 104 for example stores one or more items of electronic content, and in association with each item, the remote server 104 also for example stores an indication of a security scheme to be applied to the content once it has been downloaded to a mobile device. In one example, the security scheme is constructed from one or more security conditions defined in table I below.

TABLE I

| Security Condition | High Level Description |
|---|---|
| C0 (No Security) | Lowest security level: The content is made accessible on mobile devices without any security measures. |
| C1 (Device and/or User Authorization) | The content is made accessible only on authorized hardware and/or only for authorized user profiles. |
| C2 (Location Based) | The content is made accessible in defined zone only. The application 112 for example continuously monitors the device location in order to verify on a continual basis whether or not access should continue to be granted. |
| C3 (Password | The content is accessible only if a password is correctly entered. The password is for example a one-time |

TABLE I-continued

| Security Condition | High Level Description |
|---|---|
| Based) | password supplied to the user, for example via SMS, when the mobile device enters a predefined zone in which access to content is being made available. |
| C4 (User Authentication) | A user authentication scheme is implemented by the application 112 before the content can be accessed. This scheme for example verifies biometric data, such as a fingerprint, face image, or voice sample. |
| C5 (Continuous Identity Verification) | Continuous user identity verification is performed while the content is being accessed on the mobile device to ensure that it is the authorized user who continues to view the content, for example based on face recognition and/or voice recognition. |

Password Management 212: the remote server 104 for example stores a password in association with each item of electronic content. The remote server 104 or the application 112 of the mobile device checks that the password entered by the user when the user wishes to access the content matches one stored by the remote server 104 in association with the content. As mentioned in Table I above, the password can be a one-time password and the one-time password can be generated for each instance of a distribution of content to a mobile device.

Biometric Matching 214: the remote server 104 for example stores a list of authorized users who may access content, and one or more reference biometric samples (for example facial image, fingerprint and voice print) associated with each authorized user. The remote server 104 or the application 112 of the mobile device checks that a biometric sample provided by the user of the mobile device matches the reference biometric sample of the user.

Security Analysis Module 216: this module performs analytics to extract, for each user, their behavioural pattern, for example based on behavioural data stored on a server accessible by the module 216. This behavioural pattern can be used as an additional security check. For example, access to content is restricted if the behaviour of a certain user differs too greatly from the historical behavioural pattern of that user.

As indicated by a block 218, the remote server 104 may optionally perform one or more further functions, such as content encryption, etc.

As indicated by an arrow labelled "Push" in FIG. 2 from the remote server 104 to each mobile device 102A, 102B, 102C, in some embodiments the electronic content is pushed to the mobile devices, for example when the mobile devices enter a defined zone, i.e., an area where an event is to take place.

A query can, for example, then be displayed on the display of a mobile device 102 by the application 112 running on the mobile device, such as: "The organizers have made the following content: "Content ref" available in connection with today's event. Would you like to access this content?". However, once accepted by the user, the content is not directly accessible until all of the required security conditions are met. For example, the content is locked by encryption, and the application 112 governs the times at which all security conditions are satisfied for unlocking the content.

Alternatively, a 'push' notification that content is available within the application 112 can be sent to a mobile device when the mobile devices enter a defined zone. Then once application 112 is launched, available electronic content can be pushed to the mobile devices 102 or retrieved from the remote server 104.

In the case that one of the security conditions for access to the electronic content places restrictions on the locations in which it may be viewed, the application 112 of the mobile device 102 for example periodically determines a current location of the mobile device 102. Such location data could be provided by the GPS device 122 of the mobile device 102, and such a solution may be sufficient in some cases in which a relatively precise GPS signal is available. Alternatively, wireless transmitters, such as beacons or Wi-Fi access points, positioned within the premises of the event can be used to locate the mobile device within one or more zones, as will now be described with reference to FIGS. 3A and 3B.

Figure 3A:
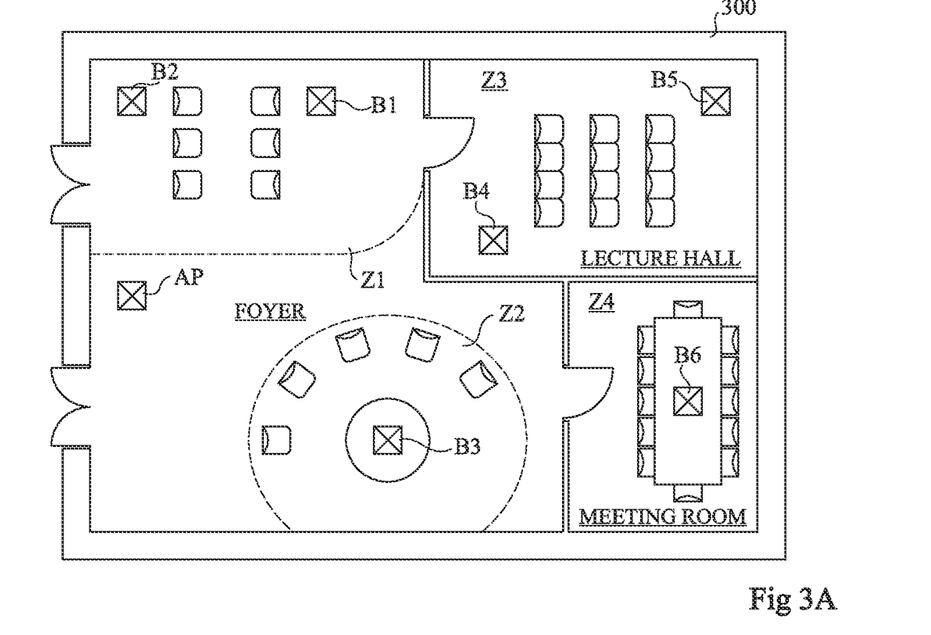
FIGS. 3A and 3B are plan views of premises comprising electronic content distribution systems according to example embodiments of the present disclosure.
Figure 3B:
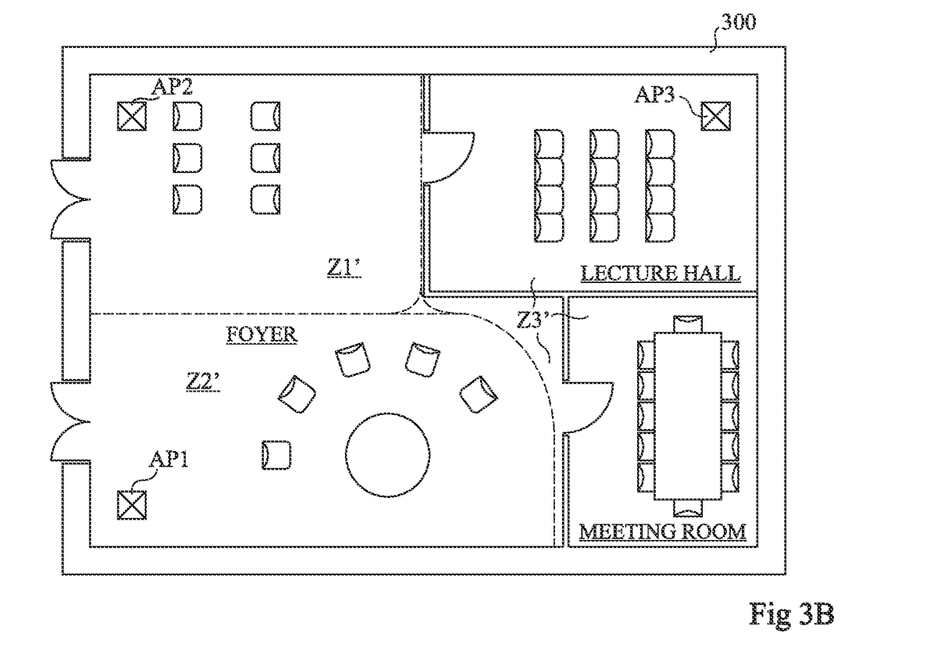

FIGS. 3A and 3B are plan views of an example of a premises 300 at which one or more events, such as conferences, seminars, business meetings, AGMs (annual general meeting), and/or other types of events, are to be held. In the examples of FIGS. 3A and 3B, the premises 300 include a foyer area having two seating areas, a lecture hall, and a meeting room.

With reference to FIG. 3A, the premises 300 for example comprises Bluetooth Low Energy (BLE) communications beacons, for example iBeacons (the term "iBeacon" may correspond to a registered trademark) B1 to B6 that define zones in which content becomes accessible. There are for example four zones, a zone Z1 corresponding to one of the seating areas in the foyer, a zone Z2 corresponding to the other seating area in the foyer, a zone Z3 corresponding to the lecture hall and a zone Z4 corresponding to the meeting room.

Each zone is defined by one or more of the beacons. For example, the beacons may be part of a beacon infrastructure with each beacon transmitting a low energy signal (e.g., a Bluetooth signal) to all detected mobile devices within its range, the signal being used by the mobile device to determine its location. For example, the signal includes data uniquely identifying the transmitting beacon, and based on the location of the beacons, which is for example known by the application 112, the location of the mobile device 102 can be approximated. Alternatively, where the locations of the beacons are fixed, the detection or non-detection of a signal from one or more of the beacons can also be used to define the zones.

For example, the zone Z1 is defined as a range of 3-6 meters from a beacon B1 or a beacon B2 positioned on either side of the corresponding seating area of the foyer; the zone Z2 is defined as a range of 1-3 meters from a beacon B3 positioned in the centre of the other seating area of the foyer; the zone Z3 is defined as anywhere in range of the beacons B4 or B5 located at opposite corners of the lecture hall; and the zone Z4 is defined as anywhere in range of a beacon B6 position on the table in the meeting room. The signal from the beacons is for example of low enough energy not to penetrate the walls of the lecture hall or meeting room.

It is assumed that a seminar takes place in the lecture hall (zone Z3) and that a coffee break is held for the participants of this seminar in the seating zone Z1. An access point AP, which is for example a Wi-Fi transceiver in communication with the remote server 104 described above, is positioned in the foyer, and when participants of the seminar enter the foyer, one or more items of electronic content are pushed to their mobile devices, but only become accessible when these participants enter a particular zone and any other security conditions are satisfied. For example, one or more items of content may be accessible while a participant is in either zone Z1 or Z2, while at least one other item of electronic content is for example of high sensitivity, and is only accessible on the mobile devices while they are within the lecture hall.

At the same time as the seminar, a board meeting is for example held in the meeting room (zone Z4), followed by drinks for the participants of this board meeting in the seating area of zone Z2. Again, one or more items of content may be pushed to attendees of this meeting via the access point AP, with some items being accessible in both zones Z2 and Z4, and other more sensitive documents being only available in the meeting room (zone 4).

When arriving at the premises 300, the participants of the seminar and of board meeting for example receive an alert, via the application 112 on their mobile devices, requesting to know which event they are attending so that the correct content is pushed to their devices. However, even if a participant of one event opts to receive content of the other event, confidentiality is assured because the content can only be accessed while the participant is within an authorized zone and any other security conditions are met.

Furthermore, in some embodiments, only participants of the relevant event are granted the right to access the content. For example, a participant list for each event is stored by the remote server, and indicates user profiles permitted to access the content. Only a user who activates an authorized profile is permitted to access the content on their mobile device.

Further still, time restrictions may additionally or alternatively be applied to the content. For example, the content for the seminar is only available while the seminar is in progress, and the content for the board meeting is only available between the start and end times of the board meeting.

It will be noted that in the embodiment of FIG. 3A, only the access point AP for example provides communications between the mobile devices 102 and the remote server 104 of FIGS. 1 and 2, the other beacons being used only for positioning purposes. Also, although Bluetooth Low Energy (BLE) communications beacons are mentioned here as exemplary, it should be understood that other wireless beacons allowing similar location determination could be used.

FIG. 3B illustrates an alternative partitioning of the premises 300. In this example there are three zones Z1', Z2' and Z3', defined by distances from three access points, of which two access points AP1 and AP2 are positioned in corners of the foyer, and a third access point AP3 is positioned in the lecture hall. In this example, the access points are wireless transceivers, for example Wi-Fi transceivers, and the zones are defined based on the signal strengths from each access point. For example, the zone Z1' is one in which the signal strength from access point AP2 is higher than that of access point AP1 or AP3. Each mobile device 102 is capable of detecting signal strengths from surrounding access points, and the application 112 is for example capable of determining the location of the mobile device based on these signal strengths. Such a method of defining event zones is for example described in more detail in commonly-owned U.S. Pat. No. 7,640,026, the contents of which are hereby incorporated herein by reference.

It will be noted that in the embodiment of FIG. 3B, any of the access points AP1, AP2 or AP3 may be used for communications between the mobile devices 102 and the remote server 104 of FIGS. 1 and 2, in addition to being used for positioning purposes.

Figure 4:
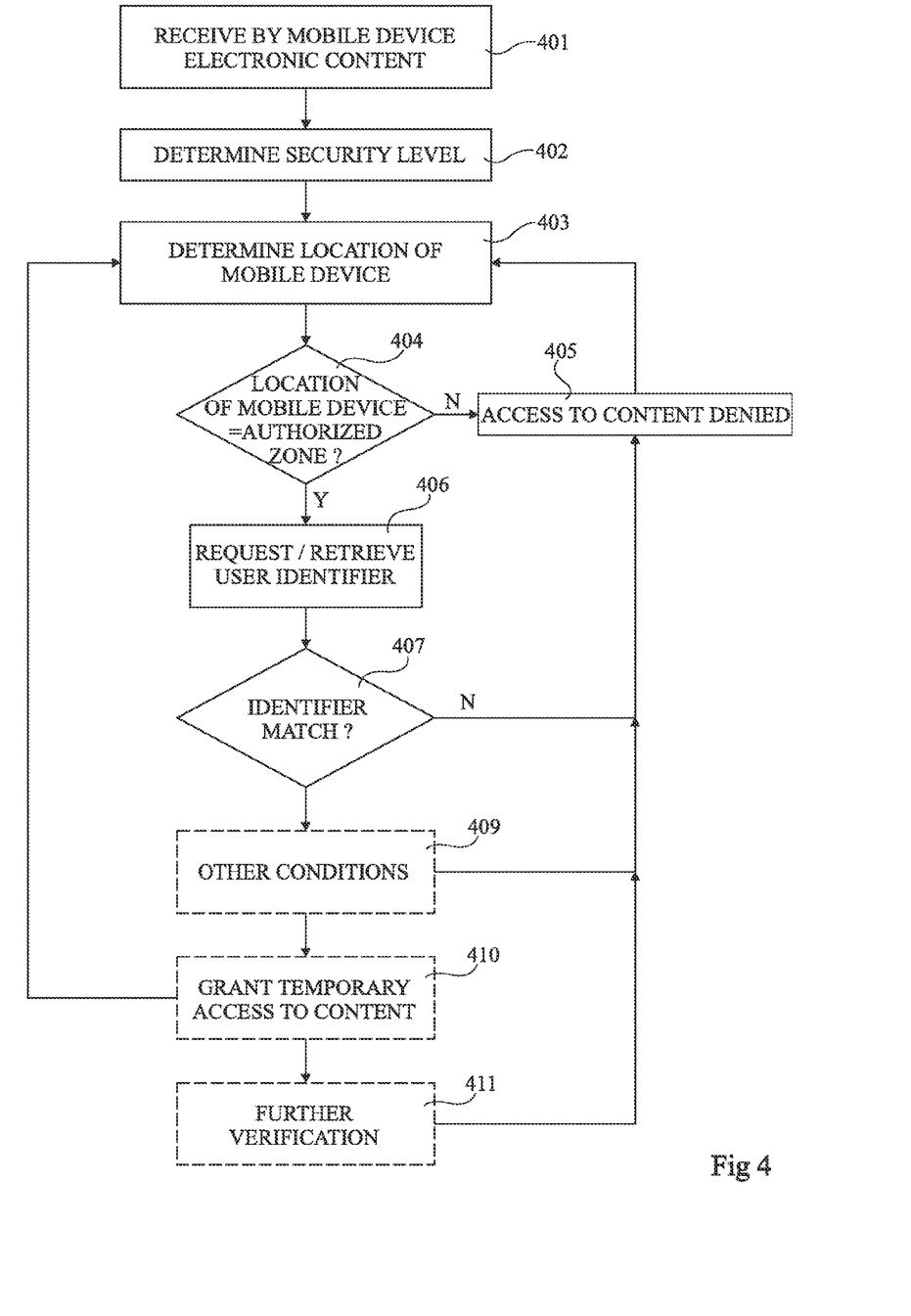
FIG. 4 is a flow diagram illustrating operations in a method of accessing electronic content on a mobile device according to an example embodiment of the present disclosure.

FIG. 4 is a flow diagram illustrating operations in a method of accessing electronic content using a mobile device according to an example embodiment. This method is for example implemented partially or entirely by execution of the application 112, by the processing device 108, on the mobile device 102 of FIG. 1.

In an operation 401, the mobile device receives an instance of electronic content. The content is for example pushed to the mobile device 102 by the remote server 104 when the mobile device is detected to be at a target location, which is for example the premises of an event attended by a user of the mobile device. For example, the user arrives at the event and launches the application 112 on the mobile device. The application 112 monitors the location of the mobile device, and when the device is in the target location, a push notification is for example sent to the mobile device with the instance of electronic content. Additionally or alternatively, a list of items of electronic content that is available to be accessed by the user is sent to the mobile device, and the user is invited to select one or more documents that they wish to access. In either case, the instance of electronic content is not accessible until one or more security conditions have been verified.

While FIG. 4 illustrates an example in which the instance of electronic content is received as an initial operation, in alternative embodiments, this content is for example only received once the security conditions have been verified.

In a subsequent operation 402, a security scheme associated with the downloaded content is determined by the mobile device comprising one or more security conditions. For example, the security scheme may be indicated by data transmitted with the instance of electronic content. Alternatively, in response to a request from the user, made using the mobile device, to access the content, the mobile device for example requests the security scheme of the document from the remote server 104. The security scheme indicates the security conditions to be imposed on the accessibility of the content. The available security conditions are for example those defined in Table I above, although there are many variants that could equally be used. In the method of FIG. 4, it is assumed that access to the instance of electronic content is restricted at least based on the location of the mobile device.

In a subsequent operation 403, the current location of the mobile device is determined. For example, as described above, the location may be obtained using a GPS device 122 of the mobile device, or based on one or more signals between the mobile device and one or more beacons or wireless access points.

In a subsequent operation 404, it is determined whether the current location of the mobile device is within an authorized zone associated with the electronic content. For example, the authorized zone is indicated by data received by the mobile device with the instance of electronic content, or requested by the mobile device from the remote server 104. The mobile device for example compares the current location with the authorized zone, to determine whether the current location falls within the authorized zone. In some embodiments, the authorized zone may be defined as a central point of the zone, and a range from this central point. In such a case, the mobile device for example compares its current location with the location of the central point to determine the distance separating the two, and then compares this distance with the range. For example, the mobile device is considered within the zone only if the distance is equal to or lower than the range.

If the current location is outside the authorized zone, the next operation is 405, in which access to the content is denied. The instance of electronic content is for example then deleted from the mobile device 102, or locked or re-encrypted, and it is not accessible until all of the security conditions are met. Alternatively, if the current location is within the authorized zone, the next operation is 406.

In operation 406, it is for example requested that the user of the mobile device enters an identifier, such as a password or a biometric sample of the user. Alternatively, such a password or biometric sample may have already been entered by the user, for example when they initiated the application 112 on the mobile device. In such a case, the identifier is for example retrieved.

In a subsequent operation 407, the identifier is for example compared with a reference value. The comparison may be performed by the mobile device 102, or at least partially by the remote server 104. If these values are found not to match, the method for example returns to operation 405, and access to the content is denied.

Alternatively, if the identifier matches the reference value in operation 407, one or more further conditions may be verified as represented by a dashed box 409. These conditions may include a time limit on the accessibility of the content, DRM restrictions, etc. If any of these further conditions fail, the method again for example returns to operation 405, in which access to the content is denied.

If all of the conditions in operation 409 are passed, or if there are no further conditions, the next operation is 410, in which temporary access is granted to the instance of electronic content. This implies that the processing device 108 of the mobile device is able to access the content and display at least some of the content on the display screen 120 of the mobile device.

Access to the content is only temporary because the location of the mobile device continues to be monitored while the content is being accessed and/or viewed, and if the mobile device 102 leaves the authorized zone, access to the content is for example again denied. For example, after a relatively short time interval of between 10 seconds and 5 minutes during which the content is accessible, the content may be deleted from the device, or it may be retained for a further period of time in a locked or re-encrypted state, meaning that it will only become accessible again if all of the security conditions are met again. The method then returns to operation 403, such that location verification is performed again. The user identifier and/or other conditions are also for example verified again, and if all of the conditions are passed, access may continue to be temporarily granted for a new period.

After or during the operation 410, a further verification is for example implemented in an operation 411. This for example involves verifying that only an authorized user of the mobile device is viewing the content. For example, this verification is based on face recognition and/or voice recognition.

In the case of face recognition, an image is taken by the camera 124 of the mobile device to capture the face of anyone viewing the display screen 120. Face recognition is then applied to the image and any faces that are found are compared to face images of all authorized viewers of the content. For example, the remote server 104 maintains a database of face images of authorized users, and the mobile device 102 sends the face images to the remote server 104 to perform this comparison. If any face is not identified as an authorized user, the method for example returns to operation 405, in which access to the content is denied. Furthermore, access may also be denied if no face is found in the image captured by the camera 124, as this may imply that the user of the mobile device 102 has left the device, and the content should be hidden from view.

Additionally or alternatively, a microphone of the mobile device 102 can be used to capture sounds in the environment of the mobile device, and access to the content can be denied if the voice of the authorized user is not recognized. For example, such a verification can be performed in the case that no face is found in the image captured by the camera.

As another example of a further verification, the application 112 is for example capable of detecting an attempt by a user to take, using the mobile device 102, a screenshot of the electronic content while any part of the content is being displayed, and preventing that attempt. If such an attempt is detected, access to the content can be for example denied and the screenshot attempt reported to the remote server 104. In other embodiments, the permanent storage of the screenshot in a memory of the mobile device is prevented by the application 112.

An advantage of the embodiments described herein is that, after the temporary storage of electronic content on a mobile device, the accessibility of this content can be restricted based on the location of the mobile device, leading to secure and robust protection of the content.

Having thus described at least one illustrative embodiment, various alterations, modifications and improvements will readily occur to those skilled in the art.

For example, it will be apparent to those skilled in the art that the various operations that are described herein as being implemented by the mobile device 102 may in some embodiments be at least partially implemented by the remote server 104. It will also be apparent to those skilled in the art that while the remote server 104 is described in relation to FIG. 1 as being implemented by a single processing device 128, in some embodiments the functionalities of the remote server 104 may be shared between several computers.

Furthermore, it will be apparent to those skilled in the art that the various features of the embodiments described could be combined, in alternative embodiments, in any combination.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a users client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a dient device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method of accessing electronic content, the method comprising:
   receiving, by a mobile device, electronic content pushed to the mobile device, the electronic content being pushed to the mobile device in response to the mobile device being detected at a target location;
   determining by the mobile device a security scheme associated with the electronic content, wherein the security scheme is indicated by data transmitted with the electronic content or subsequent to the electronic content,
      wherein the security scheme includes a security condition indicating that location verification of the mobile device being within a defined zone is required for access to the of electronic content,
      wherein the defined zone is different than the target location;
   determining a current location of the mobile device;
   comparing the current location with the defined zone within which the electronic content is accessible;
   determining, based on the comparing, whether the mobile device is located within the defined zone;
   in response to the determining that the mobile device is located within the defined zone, accessing, by the mobile device, the electronic content and providing at least part of the electronic content for display on the mobile device;
   determining a new current location of the mobile device while the electronic content is being accessed;
   determining whether the new current location of the mobile device is within the defined zone; and
   terminating by the mobile device the accessing of the electronic content in response to a determination that the mobile device is no longer within the defined zone.

2. The method of claim 1, wherein the current location and new current location of the mobile device are determined based on at least one of presence and level of one or more signals between the mobile device and one or more wireless transmitters.

3. The method of claim 1, wherein the current location and new current location of the mobile device are determined by the mobile device based on at least one of presence and level of one or more signals received from one or more wireless transmitters.

4. The method of claim 3, wherein the one or more wireless transmitters are communications beacons, and the current location and new location of the device are determined by the mobile device based on data extracted from one or more signals received from the communications beacons.

5. The method of claim 1, further comprising receiving, by the mobile device from a remote server, the electronic content and accompanying data indicating the zone within which the electronic content is accessible, and storing the electronic content and accompanying data in a volatile memory of the mobile device.

6. The method of claim 1, further comprising receiving a notification, on the mobile device, that the mobile device is located within the zone and that the electronic content is accessible.

7. The method of claim 1, further comprising determining, by the mobile device, whether a user profile activated by a user of the mobile device is authorized to view the electronic content.

8. The method of claim 1, further comprising comparing, by the mobile device, a current time with a time-limit for viewing of the electronic content, and if the time-limit has been exceeded, terminating by the mobile device the access to the electronic content.

9. The method of claim 1, further comprising:
   capturing, during the display of at least part of the electronic content, an image using a display-side camera of the mobile device;
   performing face recognition on the image to identify the presence of any faces in the image; and
   verifying that at least one of the faces is a user of the mobile device authorized to view the electronic content; and
   terminating by the mobile device the access to the electronic content if any of the faces is not an authorized user or if no face is identified.

10. The method of claim 1, further comprising preventing, during the display of at least part of the electronic content, a user of the mobile device from capturing a screenshot of any part of the electronic content.

11. The method of claim 1, wherein the security scheme comprises at least one condition of a plurality of conditions, the plurality of conditions comprising:
   the electronic content is accessible only on authorized hardware and/or only for authorized user profiles;
   the electronic content is accessible only in one or more defined zones;
   the electronic content is accessible only if a password is correctly entered;
   the electronic content is accessible only if a user authentication scheme is successful involving the verification of at least one biometric sample;

the electronic content is rendered inaccessible if the authorized user is not viewing the content.

12. The method of claim 1, further comprising, prior to accessing the electronic content by the mobile device, receiving by the mobile device identification data of the user of the mobile device, and comparing the identification data with reference data to verify the identity of the user.

13. The method of claim 1, wherein in response to determining that the new current location of the mobile device is not within the zone, the electronic content is one of deleted from the mobile device, locked, and re-encrypted.

14. The method of claim 1, wherein terminating by the mobile device the access to the electronic content does not prevent other electronic content from being accessed by the mobile device.

15. The method of claim 1, further comprising determining by the mobile device a further security scheme associated with a further electronic content, wherein the further security scheme is different from the security scheme associated with the electronic content.

16. A mobile device comprising:
   a memory for temporarily storing at least one electronic content;
   a display screen; and
   a processing device to:
      receive, from a remote server, the electronic content pushed to the mobile device, the electronic content being pushed to the mobile device in response to the mobile device being detected at a target location;
      determine a security scheme associated with the electronic content, wherein the security scheme is indicated by data transmitted with the electronic content or subsequent to the electronic content,
         wherein the security scheme includes a security condition indicating that location verification of the mobile device being within a defined zone is required for access to the electronic content,
         wherein the defined zone is different than the target location;
      determine a current location of the mobile device;
      compare the current location with the defined zone within which the electronic content is accessible;
      determine, based on the comparing, whether the mobile device is located within the defined zone;
      in response to a determination that the mobile device is located within the defined zone, access the electronic content and provide at least part of the electronic content for display on the display screen;
      determine a new current location of the mobile device while the electronic content is being accessed;
      determine whether the new current location of the mobile device is within the defined zone; and
      terminate the access of the mobile device to the electronic content in response to a determination that the mobile device is no longer within the defined zone.

17. The mobile device of claim 16, wherein the processing device is to determine the current location and new current location of the mobile device based on a presence or level of one or more signals received from one or more wireless transmitters.

* * * * *

UNITED STATES PATENT AND TRADEMARK OFFICE
CERTIFICATE OF CORRECTION

PATENT NO. : 9,622,079 B2
APPLICATION NO. : 14/645669
DATED : April 11, 2017
INVENTOR(S) : Giuseppe Giordano Page 1 of 1

It is certified that error appears in the above-identified patent and that said Letters Patent is hereby corrected as shown below:

On the Title Page

At Item (30), Foreign Application Priority Data "14305356" should be "14305356.9".

Signed and Sealed this
Fifth Day of December, 2017

Joseph Matal
*Performing the Functions and Duties of the*
*Under Secretary of Commerce for Intellectual Property and*
*Director of the United States Patent and Trademark Office*